United States Patent Office 2,787,435
Patented Apr. 2, 1957

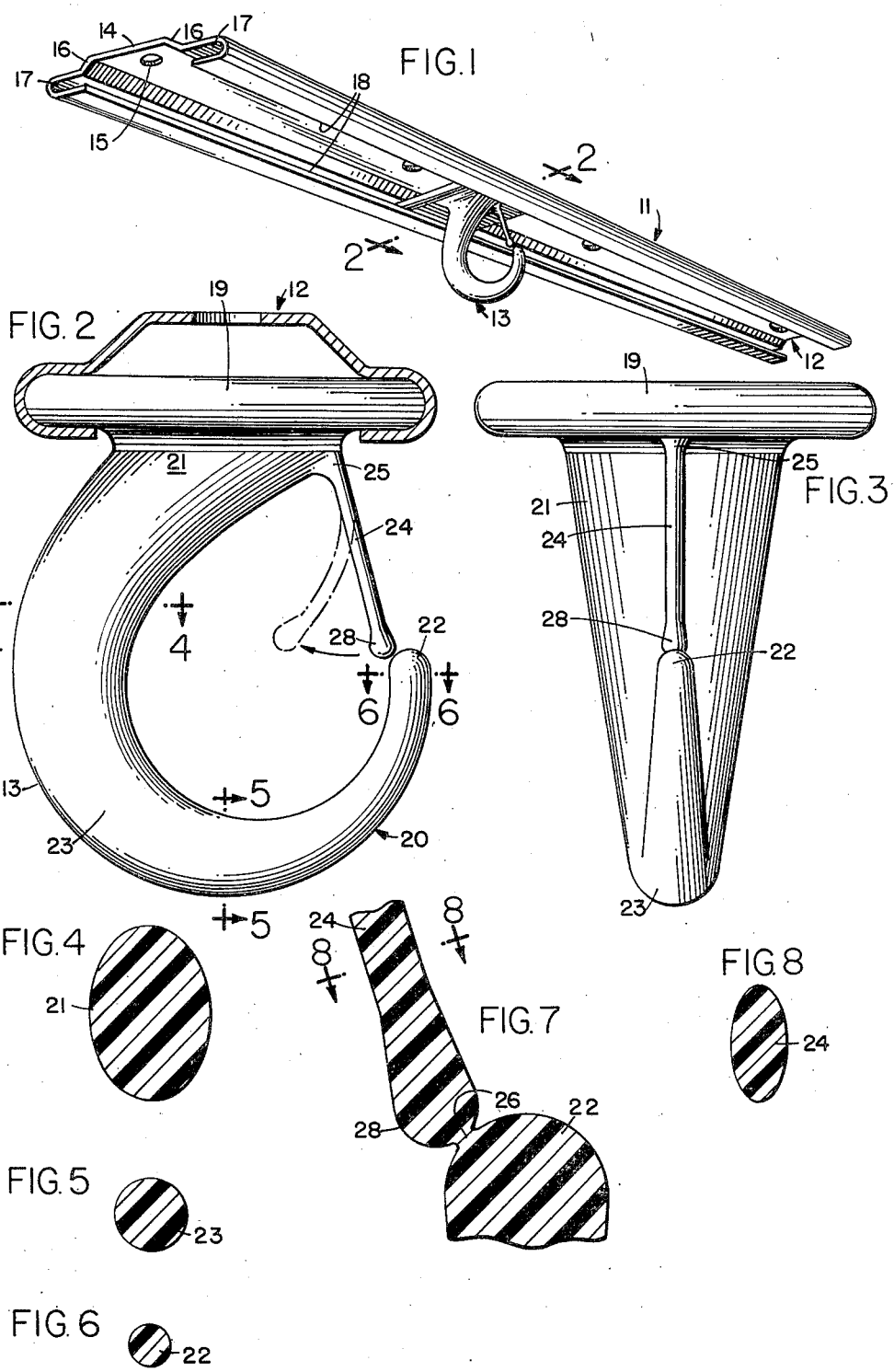

2,787,435

HANGER

Charles Culver Shields, Crozet, Va.

Application September 12, 1955, Serial No. 533,778

1 Claim. (Cl. 248—307)

The present invention relates in general to hangers, and has more specific reference to suspension devices adapted for attachment on walls, ceilings, shelves, window frames, or other suitable support means for hanging any desired article capable of being supported on suspension hooks or loops, including handled articles, such as pots, pans and cups, wearing apparel, drapery material, small articles of hardware, and the like.

An important object of the invention is to provide a suspension device comprising a track having associated therewith one or more suspension members preferably adjustable to any desired position longitudinally of the track.

Another important object is to provide a suspension member in the form of a loop or hook comprising molded plastic material, particularly nylon.

Another important object is to provide a molded nylon suspension member in the form of a loop or eye; a further object being to form the eye element with a readily severable portion whereby the same may be converted into a snap hook.

Another important object is to provide a suspension hook of plastic material having an integral plastic portion in position forming a hook-closing latch; a further object being to form the latch as a relatively slender bar integrated at the opposite ends thereof respectively with the base portions and with the tip of the hook thereby constituting the same as a loop; a still further object being to provide a readily frangible or severable portion of reduced section at the junction of the bar with the tip of the loop and to provide a strong joint of relatively massive section between the bar and the base of the hook.

Another important object is to provide a device of the character described in which the latch bar, in its medial portions is perferably of substantially uniform sectional shape; a further object being to form the bar with a relatively flattened, preferably oval sectional shape, with the longer dimension thereof extending transversely of the plane of the device; another object being to provide a slightly enlarged bulb portion at the end of the bar adjacent the tip of the hook and to integrally join said bulb portion with the hook tip by means of a joint of reduced sectional size.

Still another object of the invention consists in a hook element having a relatively rectangular base to which a hook portion is integrally formed, the hook terminating in a relatively pointed hook end, there being an integral latching member integral with a part of the hook, or the base thereof, and extending downwardly to a point adjacent the end of the hook.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective view of a hanger embodying the present invention;

Fig. 2 is an enlarged sectional view taken substantially along the line 2—2 in Fig. 1;

Fig. 3 is an end elevation of the device as shown in Fig. 2;

Figs. 4, 5 and 6 are sectional views taken substantially along the lines 4—4, 5—5 and 6—6 in Fig. 2;

Fig. 7 is an enlarged sectional view showing the latch element integral at both of its ends; and Fig. 8 is a sectional view taken substantially along the line 8—8 in Fig. 7.

To illustrate the invention, the drawings show a hanger 11 comprising a bar or track member 12 which may comprise a strip of sheet metal formed longitudinally to provide a channel for the sliding reception of a suspension member 13. To this end the track member may comprise a medial portion 14 formed at spaced apart intervals with openings 15 for the reception of fastening elements, such as screws, for securing the track member on a support upon which it may be desired to mount the device. The strip of material from which the track member 12 is formed may be bent to provide offset portions 16 on opposite sides of the medial portion 14; and the opposite edge portions of the strip, outwardly of the portions 16, may be curled and bent to form spaced apart facing grooves or channels 17, the terminal edges 18 of said curled edge portions being spaced apart in substantially parallel relationship to define therebetween a slot or opening which extends longitudinally of the track member 12.

The suspension members preferably comprise integral elements of molded plastic material, the invention more particularly contemplating molded nylon suspension members, nylon comprising a long chain synthetic polymeric amide resin having great tensile strength when molded at temperature of the order of 500° F.

Any desired number of suspension members 13 may be mounted in side-by-side relationship on the track member for adjustment longitudinally thereof. To this end, each member 13 preferably comprises a mounting base portion 19 which may be formed as a square plate, the opposite side edges of which are spaced apart a distance substantially equal to, or, if desired, somewhat less than, the distance between the bottoms of the grooves 17 of the track member 12. Each member 13 also comprises a carrying or suspension portion 20 in the form of a loop, said carrying portion 20 being mounted on and extending from the medial portions of the plate portion 19.

The suspension member 13 may be mounted in the track member 12 by inserting opposite edges of the plate portion 19 in the grooves 17, at an end of the track member, and then sliding the suspension member longitudinally in the grooves 17. When the suspension member is thus mounted on the track member, the suspension portion 20 will extend outwardly of the track member through the slot defined between the facing edges 18 thereof. The square shape of the base portion 19 permits the suspension members 13 to be mounted on the track member with the plane of the suspension portion 20 extending in oriented position either transversely or longitudinally of the track member.

The suspension portion 20 preferably comprises a portion forming a hook having an enlarged base portion 21 secured to the medial portions of the plate 19, a tip portion 22 spaced from and pointing toward the base portion 21, and an intermediate curved portion 23 diminishing in sectional size progressively from the base portion toward the tip portion. The suspension portion 20 also comprises a bar 24 of relatively slender and, hence, flexible character, said bar extending between the base portion 21 and the tip portion 22 and being integrated with the base portion by means of a joint 25 of relatively massive sectional size.

The bar 24 at its opposite end is preferably connected integrally with the tip 22 as by means of a preferably necked joint 26 of reduced sectional size. The bar 24, in its medial portions is of preferably substantially uniform sectional configuration, although, if desired, it may taper slightly from its base-connected end toward the tip-connected end thereof. As shown more especially in Fig. 8 of the drawings, the bar is preferably, though not essentially, of flattened sectional shape, and is arranged in the structure so that the longer sectional dimension of the bar 24 extends transversely with respect to the medial plane of the hook portions 21, 22 and 23, thereby making the bar slightly more flexible in the direction of said plane than in the direction transversely thereof, the sectional shape of the bar being preferably oval. The bar 24 also is preferably enlarged slightly to form a bulb 28 immediately adjacent the necked joint 26.

It will be seen from the foregoing that the suspension portion 20 provides a closed loop comprising the integrally united portions 21, 22, 23 and 24. Accordingly, it may be used as a closed suspension loop, if desired. The necked portion 26, however, is readily severable either by cutting or breaking the same in order to disconnect the bar 24 from the tip portion 22, the slight enlargement 28 assuring breakage at the necked joint by merely striking the bulbed end of the bar, adjacent the necked joint, sharply as with a suitable striking implement. The back of a knife blade, or a common screwdriver may conveniently be used for such purpose.

When the blade 24 is thus disconnected from the tip 22, the bar 24 may be easily depressed from the tip as indicated in dotted lines in Fig. 2, thereby allowing the suspension member 13 to be used as a snap hook for any desired purpose. In this connection, the severed bar 24 comprises a normally closed hook latch since the inherent resilience of the material normally urges the bar to hook closed position in engagement with the tip portion 22.

In actual practice, it has been found that the hook having the integral intact portion indicated at 26 is the desired form of construction in that it may be easily molded or otherwise formed. It is to be understood, however that the enlargement 28, Fig. 7, may not necessarily be secured to the hook end 22, but may be disconnected therefrom, whereby a latch hook device or snap element is provided which can be easily and economically manufactured and is capable of various uses, such as for coat hangers, tie hangers, drapery and curtain hangers, etc.

The latch or snap is elongated so that the lower end thereof will be below the tip end of the hook whereby the snap or latch member may be pressed manually inwardly for easy application of a device or article within the hook body, but will be prevented from snapping or springing outwardly of the inner confines of the hook after the snap part returns to its normal closed or snapped position.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

A suspension device for slidable movement in a track comprising a one-piece single unitary molded plastic body having a base member adapted to be slidably mounted in a track, a curved hook-shaped plastic member integral with the base member and having a tip end spaced from the base member, a relatively resilient plastic snap latch member integral with the base member and merging into the base member and forming a snap latch portion extending downwardly from the base of the hook toward and adjacent the tip of the hook, the tip end of the snap latch portion being normally juxtapositioned with respect to the tip end of the hook and extending inwardly of the hook body, said snap latch member being adapted to be flexed inwardly to permit articles to be hung easily upon the hook, said snap latch member being normally urged toward the tip end of the hook, said snap latch member returning to the normal position after being flexed due to the flexible resilient characteristics of the plastic material from which the aforesaid members are made.

References Cited in the file of this patent

UNITED STATES PATENTS

| 1,504,802 | Wolf | Aug. 12, 1924 |
| 2,246,212 | Lavin | June 17, 1941 |
| 2,540,330 | Gries | Feb. 6, 1951 |
| 2,679,998 | Keller | June 1, 1954 |

FOREIGN PATENTS

| 301,530 | Great Britain | Nov. 30, 1928 |
| 574,508 | Great Britain | Jan. 8, 1946 |